United States Patent [19]

Barbour et al.

[11] Patent Number: 5,843,330
[45] Date of Patent: *Dec. 1, 1998

[54] ANTI-ICING COMPOSITION HAVING ANTI-CORROSION AND ANTI-SPALLING PROPERTIES

[75] Inventors: James K. Barbour, Lincroft; Arnold Wiesenfeld, Mahwah, both of N.J.

[73] Assignee: Castlebar Industries Corp., Lincroft, N.J.

[*] Notice: The term of this patent shall not extend beyond the expiration date of Pat. No. 5,366,650.

[21] Appl. No.: 722,670

[22] Filed: Sep. 30, 1996

[51] Int. Cl.⁶ .................................................. C09K 3/18
[52] U.S. Cl. ............................................. 252/70; 106/13
[58] Field of Search .................................. 252/70; 106/13

[56] References Cited

U.S. PATENT DOCUMENTS

| | | | |
|---|---|---|---|
| 2,980,620 | 4/1961 | Hatch | 106/13 |
| 3,624,243 | 11/1971 | Scott, Jr. | 252/70 |
| 4,094,805 | 6/1978 | Hansen | 252/70 |
| 4,148,938 | 4/1979 | Hansen | 106/13 |
| 4,374,743 | 2/1983 | Stockel | 252/70 |
| 4,377,488 | 3/1983 | Gancy | 252/70 |
| 4,444,672 | 4/1984 | Gancy | 252/70 |
| 4,668,416 | 5/1987 | Neal | 252/70 |
| 4,728,393 | 3/1988 | Peel | 252/70 |
| 4,759,864 | 7/1988 | Van Neste et al. | 252/75 |
| 4,802,923 | 2/1989 | Hudec | 106/14.12 |
| 4,855,071 | 8/1989 | Todd, Jr. et al. | 252/70 |
| 4,954,279 | 9/1990 | Ma et al. | 252/70 |
| 4,986,925 | 1/1991 | Fiske | 252/70 |
| 4,990,278 | 2/1991 | Wyeth | 252/70 |
| 5,039,439 | 8/1991 | Hansman, Jr. et al. | 252/70 |
| 5,064,551 | 11/1991 | Smith | 252/70 |
| 5,118,435 | 6/1992 | Nieh | 252/70 |
| 5,211,868 | 5/1993 | Ireland et al. | 252/70 |
| 5,238,592 | 8/1993 | Stankowiak et al. | 252/70 |
| 5,273,673 | 12/1993 | Ashrawi et al. | 252/70 |
| 5,334,323 | 8/1994 | Schrimpf et al. | 252/70 |
| 5,366,650 | 11/1994 | Wiesenfeld et al. | 252/70 |
| 5,419,845 | 5/1995 | Hirozawa et al. | 106/13 |
| 5,435,930 | 7/1995 | Chan et al. | 252/70 |
| 5,461,100 | 10/1995 | Jenkins et al. | 252/70 |

FOREIGN PATENT DOCUMENTS

| | | | |
|---|---|---|---|
| 375214 | 6/1990 | European Pat. Off. . | |
| 386886 | 9/1990 | European Pat. Off. | 252/70 |
| 494506 | 7/1992 | European Pat. Off. . | |
| 156918 | 9/1982 | Germany | 252/70 |
| 60-195178 | 10/1984 | Japan | 252/70 |

*Primary Examiner*—Anthony Green
*Attorney, Agent, or Firm*—Ezra Sutton

[57] ABSTRACT

An anti-icing composition having anti-corrosion and anti-spalling properties including an anti-icing chemical selected from the group consisting of calcium chloride, sodium chloride, potassium chloride, magnesium chloride, urea, calcium magnesium acetate, calcium acetate, magnesium acetate, potassium acetate, sodium formate and combinations thereof, the anti-icing chemicals being at least 5% by weight of said anti-icing composition; an anti-corrosion compound being 2 butyne-1,4 diol in the range of trace amounts up to 5% by weight of the anti-icing composition; a water-soluble anti-spalling compound in the range of trace amounts up to 10% by weight of the anti-icing composition; and a diluent chemical, such as water, in the range of 10% to 80% by weight of said anti-icing composition.

37 Claims, No Drawings

ANTI-ICING COMPOSITION HAVING ANTI-CORROSION AND ANTI-SPALLING PROPERTIES

FIELD OF THE INVENTION

The present invention relates to an anti-icing composition having anti-corrosion and anti-spalling properties. More particularly, the anti-icer together with the anti-corrosion compound dispersed therein, such as 2 Butyne-1,4 diol, is environmentally safe and greatly reduces corrosion of steel on bridges, metal steps, loading and train platforms, ships, and motor vehicles, and greatly reduces aluminum corrosion of aircraft, and retards spalling of concrete pavements and roadway surfaces.

BACKGROUND OF THE INVENTION

Anti-icing is the snow and ice control practice of preventing the formation or development of bonded snow and ice to surfaces by timely applications of a chemical freezing-point depressant. As a result of the application of an anti-icer composition onto a substrate surface, such as a concrete highway pavement, prior to the beginning of precipitation, or at the start of a winter storm, the anti-icer will inhibit the development of a bond between the snow, frost, sleet, freezing rain, or ice and the pavement or metal surface. In operational use, moderate and periodic reapplications of the anti-icer during a winter snow or ice storm will continue this aforementioned effect. Such preventative operations prior to or at the start of a winter storm are the core of anti-icing programs for municipal, county and state governments. It provides a maintenance manager of a governmental agency with two major capabilities: the capability of maintaining roads at the highest level of service and in the best condition possible during a winter storm, and the capability to do so in a cost effective and efficient manner. As a consequence, anti-icing programs have the potential to provide the benefit of increased traffic safety at the lowest cost to the general public (the taxpayer).

There are two distinct snow and ice control strategies that make use of a chemical freezing-point depressant: deicing and anti-icing which differ in their fundamental objectives. In an anti-icing operation, a proactive strategy, the anti-icer is used to prevent the formation or development of bonded snow and ice to allow for easy removal, whereas in a deicing operation, a reactive strategy, the de-icer breaks the bond of snow and ice already bonded to the pavement.

The use of dry solid chemicals as an anti-icing treatment can be effective in many circumstances, but only those where there is sufficient moisture or accumulation of the anti-icer on the pavement. This can be accomplished by pre-treatment with a liquid anti-icer or pre-wetted deicer or the presence of ambient moisture. Moisture must be available for two reasons: to prevent substantial loss of material off a dry pavement, and to trigger the brine solution of the salt which is necessary for ice melting to occur. When there is not enough moisture or accumulation on the pavement there is likely to be loss of the chemical from the pavement. This may be caused by the blowing action of traffic, especially from high speed and commercial vehicles, or by the bouncing of particles off the pavement during spreading. In general, solid anti-icers are not usually as effective as liquid anti-icers. This is because liquids can be spread more uniformly across the surface and remain where directly applied, that is, the area of treatment.

DESCRIPTION OF THE PRIOR ART

De-icers having anti-corrosion or anti-spalling properties have been disclosed in the prior art. For example, U.S. Pat. Nos. 4,094,805 and 4,148,938 to Hansen disclose de-icing salts and de-icing solutions having an anti-spalling agent for protecting pavement or concrete materials against the destructive action of freezing and thawing of water and/or brine solutions and which prevents the spalling of the concrete substrate. U.S. Pat. No. 4,802,923 to Hudec discloses the use of multiple anti-spalling agents for concrete.

U.S. Pat. Nos. 4,954,279; 5,039,439; 5,118,435; 5,273,673; 5,334,323; 5,435,930; and 5,461,100 disclose liquid anti-icers and de-icers which in some cases have anti-corrosion properties for aircraft only.

None of the prior art patents disclose the combination of an anti-icing composition having an anti-corrosion agent and an anti-spalling agent. Further, none disclose the particular chemical components for anti-corrosion and anti-spalling agents of the present invention.

Accordingly, it is an object of the present invention to provide an improved anti-icing composition which has anti-corrosion properties and which is environmentally safe.

Another object of the present invention is to provide an improved anti-icing composition which has anti-spalling properties when applied to concrete and which is environmentally safe.

Another object of the present invention is to provide an improved anti-icing composition that has the ability to last for extended periods of time on substrate surfaces, such as steel, aluminum, brick, concrete, asphalt, wood, gravel and the like, while substantially reducing ice melter induced damage to that substrate surface.

Another object of the present invention is to provide an improved anti-icing composition that can be applied to highways, roads, sidewalks, pavements, driveways, outdoor parking areas, outdoor stairways, bridges, railroad platforms, overpasses, ramps, intersections, loading docks, airport runways and taxiways, environmentally sensitive areas, tunnel entrances and exits, aircraft, ships and the like.

Another object of the present invention is to provide an improved anti-icing composition that requires no clean-up, as the anti-icer leaves no salt residue which reduces overall corrosion to substrates, and helps prevent secondary general corrosion to all types of motor vehicles.

Another object of the present invention is to provide an improved anti-icing composition which benefits the user with labor and product savings, by requiring substantially less solid de-icers, reduced contract/overtime labor, reduced equipment, and reduced operational and clean-up costs.

Another object of the present invention is to provide an improved anti-icing composition that can be effectively used with traditional de-icers for greater protection of surface infrastructures for anti-icing programs.

Another object of the present invention is to provide an improved anti-icing composition for use in a solid form, such that the solid anti-icing composition is used in conjunction with the liquid anti-icing composition or by it-self, where the solid anti-icing composition acts as a time release agent that can be applied to metal or concrete surfaces in sufficient quantities to reduce the number of subsequent storm event applications.

A further object of the present invention is to provide an improved anti-icing composition that can be easily produced in an automated and economical manner and is readily affordable by various governmental agencies and corporate users.

SUMMARY OF THE INVENTION

In the present invention, there is provided an anti-icing composition having anti-corrosion and anti-spalling properties, which include an anti-icing chemical selected from the group consisting of calcium chloride, sodium chloride, potassium chloride, magnesium chloride, urea, calcium magnesium acetate, calcium acetate, magnesium acetate, potassium acetate, sodium formate and combinations thereof, said anti-icing chemicals being at least 5% by weight, preferably at least 17% by weight, of the anti-icing composition; an anti-corrosion compound being 2 butyne-1,4 diol in the range of trace amounts up to 55 by weight of the anti-icing composition; a water-soluble anti-spalling compound in the range of trace amounts up to 10% by weight of the anti-icing composition; and a diluent chemical such as water, in the range of 0% to 80% by weight of the anti-icing composition.

DETAILED DESCRIPTION OF THE PREFERRED EMBODIMENT

In the present invention, the preferred embodiment of the anti-icing composition having anti-corrosion and anti-spalling properties includes the following in liquid and dry form:

| Component Compound | Liquid Form Range (By Weight) | Dry Form Range (By Weight) |
|---|---|---|
| I. Anti-icing base compounds such as magnesium chloride (MgCl$_2$), calcium magnesium acetate (CaMgAc), potassium acetate (KAc), magnesium acetate (MgAc$_2$), calcium acetate (CaAc$_2$), sodium acetate (NaAc), sodium formate (NaCHO$_2$) calcium chloride (CaCl$_2$), sodium chloride (NaCl), potassium chloride (KCl), urea, and polyols. | 5% to 35% | 75% to 99% |
| II. pH control agents such as sodium bicarbonate (NaHCO$_3$), or citric acid, or fumaric acid, or equivalents thereof. | Trace amounts to 0.5% | Trace amounts to 0.5% |
| III. Anti-spalling compounds including silane compounds such as alkyltrialkoxysilane, cellulosic compounds such as sodium carboxy methyl cellulose, phosphate compounds such as monocalcium phosphate, polymer oxides such as polyethylene oxide, chloride compounds such as magnesium chloride, or equivalents thereof. | Trace amounts to 10% | Trace amounts to 10% |
| IV. Anti-corrosion compounds such as: A) Thiourea and its derivatives. Examples of these compounds are diethyl thiourea, allyl thiourea, 1-(3 amino-4-phenylazopyrazol-5-yl)-3-benzyl thiourea, quinoline, and/or acriflavine; or B) Aromatic and alkyl amines and their derivatives. Examples of these compounds are alkyl aryl amines, alkynoxymethyl amines, oximines, nitriles, nitropyridine, lutidine, collidine, mono n-butyl amine, dibutyl amine, tributyl amine, phenylene diamine and derivatives (ortho, meta and para), cyclo hexyl amine, and diphenyl amine; or C) Quaternaries and their derivatives. Examples of these compounds are: 1,1'-alkylene bispyridinium compounds with quaternary substitution on the ring, and hexamethylenetetramine hydro iodide; or D) Fatty acid ethoxylates and their derivatives. Examples of these compounds are: tall oil fatty acid ethoxylates, soya bean fatty acid ethoxylates, cotton seed oil fatty acid ethoxylates, and linseed oil fatty acid ethoxylates; or E) Sulfur-containing compounds. Examples of these compounds are: sulfoxides, alkyl sulfides, dibutyl sulfide, thiosemicarbazide, 1-phenyl thiosemicarbazide, metacaptans, thioethers, sulfonium, thiocyanates, and 2-mercaptobenothiazole; or F) Acetylenic alcohol compounds. Examples of such compounds are: 2 butyne-1,4 diol and 2 propyne-1-ol; or G) Heteraromatic compounds. An example of such a compound is: benzotriazole; or H) Miscellaneous compounds. Examples of these compounds are: sodium citrate, citric acid, formaldehyde, furfuraldehyde, biguanide, guanylurea, biuret, coal tar extracts, para toluene sulfonic acid, beta naphthalene sulfonic acid, katapins, Rodine (trade name) 204, Tomah Inhibitor 60Q, Tomah Inhibitor 60S, [76162-22-8], chimec 315S [88385-18-6], tenzinat PA-221 [88403-32-1], and Rodine (trade name) 213. | Trace amounts to 5% | Trace amounts to 5% |
| V. Diluents such as water, methanol, isopropanol, ethylene glycol, diethylene glycol, trimethylene glycol, propylene glycol and dipropylene glycol. | 10% to 80% | 0.10% to 5% |
| VI. Abrasive components such as sand, grit, ash, dyes, pumice and/or chipped glass aggregate. | 10% to 96% | 10% to 96% |
| VII. Identification component such as a water-soluble dye. | Trace to 0.5% | Trace to 0.5% |

The anti-icing composition of the present invention includes a base compound such as magnesium chloride, calcium magnesium acetate, potassium acetate, magnesium acetate, calcium acetate, sodium acetate, sodium formate, calcium chloride, sodium chloride or potassium chloride and/or combinations of the foregoing. The additive materials used for anti-corrosion and anti-spalling for the present invention may be used as an additive agent to any of the foregoing base compounds. These anti-corrosion and anti-spalling materials in use with the anti-icing composition will substantially decrease corrosion of metallic surfaces; and will also substantially decrease spalling of concrete surfaces, thereby enhancing the anti-icing composition characteristics and properties in use for the anti-icing of a variety of surfaces.

The present invention uses any anti-corrosion compound that prevents base metal attack in a steel pickling bath, such as 2 butyne-1,4 diol, acetylenic alcohol derivative, alkyl amine, oximines, aryl amines, thiourea derivatives, aromatic and alkyl amine derivatives, amine compounds such as Tomah Inhibitor 60Q and 60S ™, quaternaries, fatty acid ethoxylates, complex sulfur compounds, heteroaromatics and other miscellaneous compounds (as listed in section IV.H).

It should be noted that the anti-icing composition of the present invention can operate under either acidic or alkaline conditions. Based on the application of use, the anti-icing composition may be adjusted by an appropriate Ph control agent such as sodium bicarbonate (alkaline), citric acid or fumaric acid (acidic) to make it either alkaline or acidic for the condition of use. An alkaline anti-icing composition would be used for such applications as steel bridges, parking decks, metal platforms, railroad station platforms, metal structures and the like. An acidic anti-icing composition would be used for such applications as asphalt, concrete, gravel, or dirt roads, highways and the like.

The present invention has a number of different applications and uses which determines the particular compounds and formulations used in the anti-icing composition. For example, when spraying the liquid anti-icing composition on a steel bridge, the anti-corrosive agent is the paramount factor for preventing corrosion to the steel structure. Any one of several anti-corrosion compounds can be used, such as thiourea and its derivatives; aromatic and alkyl amines and their derivatives; quaternaries and their derivatives; fatty acid ethoxylates and their derivatives; sulfur-containing compounds; acetylenic alcohol compounds; or heteroaromatic compounds, oximines and equivalents thereof.

Another example, when using the liquid anti-icing composition for a concrete bridge having some steel structure, the anti-spalling agent is the important factor for preventing the spalling (break-up) of the concrete roadway on the concrete and steel bridge structure. Any one of several anti-spalling compounds can be used, such as silane compounds, phosphate compounds, polymeric oxides and their derivatives, and their equivalents. The anti-icing composition of the present invention provides a sprayable material with good mechanical and environmental properties.

Another application for use of the liquid anti-icing composition is to form a liquid or solid concentrate which is used at a later time for dispersion into a diluent, such as water or glycol. In addition, the liquid form of the present invention or the liquid concentrate may be sprayed onto a solid deicer or ice melter, such as solar rock salt to provide ice melting and anti-icing capabilities.

Inexpensive water soluble dyes may be added to the anti-icing composition of the present invention for the specific purpose of indicating areas that have already been sprayed during an anti-icing operation. Prior to a storm event, a coating of the anti-icing composition of the present invention is applied to a clean surface. After a light coating of snow or ice occurs, dye is added to the anti-icing composition and is then applied to the snow or ice covered surface. Repeated applications of the anti-icing composition and dye may be applied, as needed. The use of the dye is most effective during the repeated applications of the anti-icing composition since the colored dye can be easily identified to indicate treated surfaces, so that untreated surfaces can be easily identified. In addition, when heavier dye applications are applied by "jetting" because of an intense snow or ice storm, the indicator dye makes it easier to determine the success of the heavier anti-icing application reaching the pavement surface through previously treated slushy snow or ice.

The preferred embodiment in liquid or solid form of the present invention provides greater reduction of corrosion and spalling as an anti-icing composition than is provided by previous anti-icing compositions. In prior anti-icing compositions, protection against corrosion used magnesium chloride ($MgCl_2$) only. As shown in Table 1, it provided a corrosion rate of 9.3 mils per year on mild steel and 4.9 mils per year on aluminum. For protection against spalling using magnesium chloride ($MgCl_2$) only, as shown in Table 2, it provided a cumulative weight of spalled concrete material of 1.3 g for 5 freeze/thaw cycles, 2.9 g for 10 freeze/thaw cycles and 3.9g for 15 freeze/thaw cycles. In the preferred embodiment (composition is listed below) of the present invention, protection against corrosion, as shown in Table 1, provided a corrosion rate of only 3.2 mils per year on mild steel and only 2.7 mils per year on aluminum. For protection against spalling using the preferred embodiment, as shown in Table 2, provided a cumulative weight of spalled concrete material of zero g for 5 freeze/thaw cycles, 0.1 g for 10 freeze/thaw cycles, and 0.3 g for 15 freeze/thaw cycles. The aforementioned demonstrated a reduction in corrosion rate of over 190% for steel and over 80% for aluminum when using the preferred embodiment of the anti-icing composition instead of the anti-icing composition using magnesium chloride only. There is also a reduction in spalling of concrete of 1200% (12.0 xtimes) in a 15 freeze thaw cycle using the preferred embodiment of the anti-icing composition versus the anti-icing composition using magnesium chloride only. The following examples illustrate the practice of this invention.

EXAMPLE I

The preferred anti-icing composition in liquid form is as follows:

I. An anti-icing base compound of magnesium chloride in the range of 5% to 34% by weight, and a preferred weight of 28%.

II. A pH control agent of sodium bicarbonate in the range of trace amounts to 0.5% by weight, and a preferred amount of 1 ppm (0.001% by weight).

III. An anti-spalling compound of alkyltrialkoxysilane in the range of trace amounts to 10% by weight, and a preferred weight of 1.0%.

IV. An anti-corrosion compound of 2 butyne-1,4 diol in the range of trace amounts to 1% by weight, and a preferred weight of 0.1%.

V. A diluent being water in the range of 0% to 80% by weight, and a preferred weight of 70.8%.

A series of laboratory tests were performed to evaluate corrosion rates on steel and aluminum for a variety of standard anti-icing compositions, and the aforementioned preferred embodiment with the use of tap water as the control. The procedures followed were in accord with the NACE Standard TM0169-76 "Standard Test Method," and "Laboratory Corrosion Testing of Metals for the Process Industries." The results of these laboratory tests are shown in Table 1 listed below.

The results show that magnesium chloride, magnesium acetate and calcium magnesium acetate are not as effective as the tap water control in preventing corrosion to the steel and aluminum samples. However, the anti-icing composition of the preferred embodiment is more effective in preventing corrosion to the steel and aluminum samples than the tap water control used.

TABLE 1

CORROSION RATES ON MILD STEEL AND ALUMINUM USING VARIOUS ANTI-ICING COMPOSITIONS

| ANTI-ICING COMPOSITIONS | CORROSION RATE IN MILS ON MILD STEEL | CORROSION RATE IN MILS ON ALUMINUM |
|---|---|---|
| Anti-icer composition of the present invention | 3.2 | 2.7 |
| Tap water | 4.6 | 3.0 |
| $MgCl_2$ | 9.3 | 4.9 |
| $MgAc_2$ | 9.8 | 5.8 |
| CMA | 11.0 | 9.5 |
| KAc | 11.6 | 6.4 |
| $CaCl_2$ | 20.1 | 15.4 |
| NaCl | 23.4 | 18.7 |
| KCl | 27.2 | 20.8 |

EXAMPLE II

A series of laboratory tests were performed to evaluate the spalling effects of a variety of anti-icing compositions including the preferred embodiment of the present invention using tap water as the control. The test procedures that were followed were in accord with the Strategic Highway Research Program, "Handbook of Test Methods for Evaluating Chemical Deicers," SHRP H-205.8; November 1992. The results of these laboratory tests are shown in Table 2 listed below.

The results show that potassium acetate, magnesium chloride, and magnesium acetate are not as effective as the tap water control in the prevention of spalling on a concrete surface for the 5, 10, and 15 freeze thaw cycles of the experiment. Calcium magnesium acetate is slightly better than the tap water control in preventing the accumulated spalling of the concrete surface during the 5, 10, and 15 freeze/thaw cycles. However, the anti-icing composition of the preferred embodiment using a silane anti-spalling agent is more effective in preventing spalling of a concrete surface than the tap water control used during the 5, 10, and 15 freeze/thaw cycles of the experiment.

compositions are shown in Table 3 and the results of these laboratory tests are shown in Tables 4 and 5 listed below.

Table 3 shows the various formulas R, Q, and S used, having the anti-spalling agent alkyltrialkoxysilane vary at a 0%, 1.0% and 10.0% levels for this laboratory experiment. In the test procedure, concrete cubes (4 inches per side) were prepared using cement-type I, rounded river gravel, sand, water and neutralized virsol resin. After a two week curing period, these 5000 psi strength concrete cubes having an air content of about 6% are sprayed at a rate of 150 $ft^2$ per gallon with each sealer formula R, Q, S, and the control is sprayed with tap water. Two concrete cubes were used for each formula R, Q, S and the control for this anti-spalling evaluation, and each of these treated concrete cubes were dried for a two (2) week period. After drying, the concrete cubes were soaked in a 150 salt brine for a three (3) week period. Table 4 below shows the percent of weight gain for each concrete cube treated. The untreated cubes of formulas R and the control gained weight at a ratio of approximately 3.25:1 as compared to the treated cubes of formulas Q and S. The effect on the treated concrete cubes having the formulas Q & S containing the 1.0% and 10.0% silane respectively, is to greatly reduce the amount of salt brine penetration into these concrete cubes. Thus, there is less brine penetration for the treated cubes, when freezing does occur. There is correspondingly reduced spalling (breaking-up) of the treated concrete surfaces versus the non-treated concrete surfaces. At low levels of water/brine penetration, when freezing does occur, the treated concrete can withstand the internal strain and pressure of the frozen water molecules and not spall. As noted in Table 4 the control and formula R did not reduce brine penetration into the nontreated concrete cubes.

Upon allowing the concrete cubes to dry an additional three (3) weeks, the percent weight gain compared to the dry weight was measured again and Table 5 below shows the percent weight gain for each treated concrete cube. As result of this additional drying, the treated concrete cubes retained between 15% to 30% only of the weight gained during brine solution exposure while the untreated concrete cubes still retained over half of the weight gained. This shows that in using formulas Q & S, the treated concrete cubes allowed for the escape of water vapor from the concrete surfaces which

TABLE 2

EVALUATION OF SPALLING EFFECTS ON ANTI-ICING COMPOSITIONS ON CONCRETE SURFACES BASED ON CUMULATIVE WEIGHT OF SPALLED MATERIAL

|  | NaCl | $CaCl_2$ | KAc | $MgCl_2$ | $MgAc_2$ | CMA | TAP WATER | ANTI-ICER COMPOSITION |
|---|---|---|---|---|---|---|---|---|
| 5 F/T CYCLES | 42.8 | 26.8 | 1.6 | 1.3 | 1.0 | 0.1 | 0.2 | 0.0 |
| 10 F/T CYCLES | 149.3 | 59.7 | 3.2 | 2.9 | 2.2 | 0.7 | 0.9 | 0.1 |
| 15 F/T CYCLES | 241.1 | 99.7 | 4.7 | 3.9 | 3.1 | 1.9 | 1.9 | 0.3 |

EXAMPLE III

A further series of tests were conducted to evaluate the effectiveness of the anti-spalling agent- of the preferred embodiment at various levels using tap water as the control. The test procedures that were followed were in accord with the National Cooperative Highway Research Program (NCHRP), Report No. 244, "Concrete Sealers for Protection of Bridge Structures." The formulas of various anti-icing is very important for allowing the concrete to thoroughly dry out. The control and formula R tended to retain the absorbed water/brine within the concrete cubes. Therefore, this silane anti-spalling agent allows the solution absorbed to escape better than the untreated surface.

As spalling is a result of water freezing- within the concrete structure, these anti-spalling silanes act to inhibit water penetration into the concrete and hence reduce the pressure exerted within the concrete by the expansion of freezing water. The coating allows the water that does penetrate the concrete to escape and not be trapped within the concrete.

TABLE 3

ANTI-ICING COMPOSITIONS
TESTED FOR ANTI-SPALLING EFFECTIVENESS

| COMPONENT[<]Tc:;5 FORMULA | R | Q | S | CONTROL |
|---|---|---|---|---|
| MAGNESIUM CHLORIDE | 22.0% | 22.0% | 22.0% | 0 |
| ALKYLTRIALKOXY- SILANE | 0 | 1.0% | 10.0% | 0 |
| 2 BUTYNE-1,4 DIOL | 0.1% | 0.1% | 0.1% | 0 |
| TAP WATER | 77.9% | 76.9% | 67.9% | 100% |
| TOTAL | 100% | 100% | 100% | 100% |

TABLE 4

% WEIGHT GAIN OF BRINE SOLUTION AFTER A THREE WEEK
SOAK PERIOD FOR BRINE PENETRATION LEVELS

| % WEIGHT GAIN\ FORMULA | CONTROL | R | Q | S |
|---|---|---|---|---|
| CUBE 1 | 2.6% | | | |
| CUBE 2 | 2.8% | | | |
| CUBE 3 | | 2.5% | | |
| CUBE 4 | | 2.4% | | |
| CUBE 5 | | | 1.0% | |
| CUBE 6 | | | 0.9% | |
| CUBE 7 | | | | 0.7% |
| CUBE 8 | | | | 0.6% |

TABLE 5

% WEIGHT GAIN OF BRINE SOLUTION AFTER A THREE WEEK
SOAK PERIOD AND A THREE WEEK DRYING PERIOD FOR BRINE
PENETRATION LEVELS

| % WEIGHT GAIN\ FORMULA | CONTROL | R | Q | S |
|---|---|---|---|---|
| CUBE 1 | 1.4% | | | |
| CUBE 2 | 1.5% | | | |
| CUBE 3 | | 1.3% | | |
| CUBE 4 | | 1.2% | | |
| CUBE 5 | | | 0.4% | |
| CUBE 6 | | | 0.3% | |
| CUBE 7 | | | | 0.1% |
| CUBE 8 | | | | 0.1% |

EXAMPLE IV

The preferred anti-icing composition in solid form is as follows:

I. An anti-icing base compound of magnesium chloride hexahydrate in the range of 95 to 99% by weight, and a preferred weight of 98%.

II. A pH control agent of sodium bicarbonate in the range of trace amounts to 0.5% by weight, and a preferred weight of 3 ppm (0.003% by weight).

III. An anti-spalling compound of alkyltrialkoxysilane in the range of trace amounts to 10% by weight, and a preferred weight of 1.75%.

IV. An anti-corrosion compound of 2 butyne-1,4 diol in the range of trace amounts to 1% by weight, and a preferred weight of 0.1%.

Using this solid form of the anti-icing composition of the preferred embodiment, after the application of the liquid form of the anti-icing composition (having anti-corrosion and anti-spalling properties of the preferred embodiment) sustains the aforementioned anti-corrosion and/or anti-spalling effects, as previously shown in examples I, II, and III.

Another series of tests were conducted on the rate of metal corrosion to evaluate the effectiveness of the solid anti-icing composition of the preferred embodiment, after the application of the liquid anti-icing composition of the preferred embodiment on steel and aluminum with tap water as the control. The procedures followed were in accord with the NACE Standard TM0169-76 "Standard Test Method," and "Laboratory Corrosion Testing of Metals for the Process Industries." The results of these laboratory tests are shown in Table 6 listed below.

The test procedure started with the dispensing and spraying of 2 to 4 oz of the liquid anti-icing composition on 1 square yard each of metal surfaces, i.e., mild steel and aluminum. Corrosion rates in mils were measured after a period of one month's exposure for the tap water control and the preferred embodiment of the liquid anti-icing composition. Then, 2 to 4 oz per square yard of the solid anti-icing composition of the preferred embodiment were dispersed for a second treatment on the same mild steel and aluminum surfaces previously treated by the liquid anti-icing composition. The solid form of the anti-icing composition slowly dissolved on the pretreated surfaces of mild steel and aluminum for a period of 4 to 8 hours and was then left in place for another one month period, and corrosion rates were measured again, as shown in Table 6. The rates of corrosion were consistent with the performance of the liquid anti-icing composition results reported in Example I.

TABLE 6

CORROSION RATES ON MILD STEEL AND ALUMINUM
USING THE LIQUID AND SOLID ANTI-ICING
COMPOSITION OF THE PREFERRED EMBODIMENTS
VERSUS A TAP WATER CONTROL

| FORM OF ANTI-ICING COMPOSITION USED | CORROSION RATE ON MILD STEEL IN MILS | CORROSION RATE ON ALUMINUM IN MILS |
|---|---|---|
| LIQUID: 1ST MONTH PERIOD ANTI-ICER | 3.1 | 2.6 |
| SOLID: 2ND MONTH PERIOD ANTI-ICER | 3.9 | 3.0 |
| TAP WATER CONTROL FOR: 1ST MONTH PERIOD | 4.8 | 3.1 |
| TAP WATER CONTROL FOR: 2ND MONTH PERIOD | 5.9 | 3.8 |

EXAMPLE V

A further series of laboratory tests were performed to evaluate the cumulative effect of spalling on a concrete surface having applied to it the solid anti-icing composition of the preferred embodiment after the application of the liquid anti-icing composition of the preferred embodiment on the same concrete surface with tap water as the control. The test procedures that were followed were in accord with the Strategic Highway Research Program, "Handbook of Test Methods for Evaluating Chemical Deicers," SHRP H-205.8; November 1992. The results of these laboratory tests are shown in Table 7 listed below.

The test procedure started with the dispensing and spraying of 2 to 4 oz per square yard of liquid anti-icing composition on a 1 square foot 5000 psi concrete block being 4 inches in thickness. Cumulative spalling weights in grams were measured, after each concrete block (tap water control and liquid anti-icer) underwent a 5, 10, and 15 freeze/thaw cycles. Then, 2 to 4 oz per square yard of the solid anti-icing composition of the preferred embodiment were dispersed for a second treatment on the same concrete block surfaces previously treated by the liquid anti-icing composition. The solid form of the anti-icing composition slowly dissolved on the pretreated surfaces of concrete blocks for a period 6 to 8 hours and was then left in place for another series of 5, 10, and 15 freeze/thaw cycles, and cumulative weights due to spalling were measured again at each freeze/thaw cycle points of 5, 10, and 15 F/T, as shown in Table 7. The cumulative spalling weights were consistent with the performance of the liquid anti-icing composition results reported in Example-II.

TABLE 7

EVALUATION OF SPALLING EFFECTS USING LIQUID AND SOLID ANTI-ICING COMPOSITIONS ON CONCRETE SURFACES BASED ON CUMULATIVE WEIGHT OF SPALLED MATERIAL

| 1ST SET OF FREEZE/THAW CYCLES | 1ST TREATMENT PHASE | |
|---|---|---|
| | TAP WATER CONTROL | ANTI-ICER COMPOSITION |
| 5 F/T CYCLES | 0.3 | 0.0 |
| 10 F/T CYCLES | 0.9 | 0.1 |
| 15 F/T CYCLES | 1.8 | 0.3 |

| 2ND SET OF FREEZE/THAW CYCLES | 2ND TREATMENT PHASE | |
|---|---|---|
| | TAP WATER CONTROL | ANTI-ICER COMPOSITION |
| 5 F/T CYCLES | 2.5 | 0.5 |
| 10 F/T CYCLES | 3.5 | 0.9 |
| 15 F/T CYCLES | 4.6 | 1.9 |

In summary, Examples IV and V show the effectiveness of the subsequent treatment using the solid form and that it acts in synergy with the liquid form to sustain the anti-corrosion anti-spalling effects of the anti-icers of the preferred embodiments. Further, the solid form, which requires up to several hours to typically fully dissolve, acts as a time release formulation of the anti-icer, which is an additional object of the invention. While solid anti-icers by themselves are generally less effective than liquid anti-icers (due to bounce and scatter and traffic and wind dispersion) the present invention shows it to be more effective when used in conjunction with a liquid anti-icer. This combination displays characteristics of staying in place better, due to the liquid anti-icer being present, and further displaying a time release characteristic by more easily maintaining the solution strength and slowing down its dilution rate due to outside moisture or precipitating events, such as ice, snow, hail, etc.

ADVANTAGES OF THE PRESENT INVENTION

Accordingly, an advantage of the present invention is that it provides for an improved anti-icing composition which has anti-corrosion properties and which is environmentally safe.

Another advantage of the present invention is that it provides for an improved anti-icing composition which has anti-spalling properties when applied to concrete and which is environmentally safe.

Another advantage of the present invention is that it provides for an improved anti-icing composition that has the ability to last for extended periods of time on substrate surfaces, such as steel, aluminum, brick, concrete, asphalt, wood, gravel and the like, while substantially reducing damage to that substrate surface.

Another advantage of the present invention is that it provides for an improved anti-icing composition that can be applied to highways, roads, sidewalks, pavements, driveways, outdoor parking areas, outdoor stairways, bridges, railroad platforms, overpasses, ramps, intersections, loading docks, airport runways/taxiways, tunnel entrances/ exits, aircraft, ships and the like.

Another advantage of the present invention is that it provides for an improved anti-icing composition that requires no clean-up, as the anti-icer leaves no salt residue which further reduces overall corrosion to substrates, and helps to prevent general secondary corrosion to all types of motor vehicles.

Another advantage of the present invention is that it provides for an improved anti-icing composition which benefits the user with labor and product savings, by requiring substantially less solid de-icers, reduced contract/ overtime labor, reduced equipment, and reduced operational and clean-up costs.

Another advantage of the present invention is that it provides for an improved anti-icing composition that can be effectively used with traditional de-icers for greater protection of surface infrastructures for anti-icing programs.

Another advantage of the present invention is that it provides for an improved anti-icing composition for use in a solid form, such that the solid anti-icing composition is used in conjunction with the liquid anti-icing composition or by it-self, where the solid anti-icing composition acts as a time release agent that can be applied to metal or concrete surfaces in sufficient quantities to reduce the number of subsequent storm event applications.

A further advantage of the present invention is that it provides for an improved anti-icing composition that can be easily produced in an automated and economical manner and is readily affordable by various governmental agencies and corporate users.

A latitude of modification, change, and substitution is intended in the foregoing disclosure, and in some instances, some features of the invention will be employed without a corresponding use of other features. Accordingly, it is appropriate that the appended claims be construed broadly and in -a manner consistent with the spirit and scope of the invention herein.

What is claimed is:

1. An anti-icing composition having anti-corrosion and anti-spalling properties, comprising:
   a) an anti-icing chemical selected from the group consisting of calcium chloride, sodium chloride, potassium chloride, magnesium chloride, urea, calcium magnesium acetate, calcium acetate, magnesium acetate, potassium acetate, sodium acetate, sodium formate, polyols and combinations thereof, said anti-icing chemical being at least 5% by weight of said anti-icing composition;
   b) an anti-corrosion compound being 2 butyne-1,4 diol in the range of trace amounts up to 5% by weight of said anti-icing composition;
   c) a water-soluble anti-spalling compound in the range of trace amounts up to 10% by weight of said anti-icing composition; said anti-spalling compound being selected from the group consisting of a silane compound, a cellulosic compound, a phosphate compound, a polymer oxide, and a chloride compound; and d) a diluent chemical in the range of 10% to 80% by weight of said anti-icing composition.

2. An anti-icing composition in accordance with claim 1, wherein said anti-icing composition has a pH value of greater than 7 so as to be alkaline.

3. An anti-icing composition in accordance with claim 2, wherein said anti-icing composition has a pH value in the range of between 7.5 and 8.5 so as to be alkaline.

4. An anti-icing composition in accordance with claim 1, wherein said anti-icing composition has a pH value of less than 7 so as to be acidic.

5. An anti-icing composition in accordance with claim 4, wherein said anti-icing composition has a pH value in the range of 5.5 and 6.5 so as to be acidic.

6. An anti-icing composition in accordance with claim 1, wherein said 2 butyne-1,4 diol is dispersed in said anti-icing composition in the range of 1 ppm up to 1% by weight.

7. An anti-icing composition in accordance with claim 1, wherein said 2 butyne-1,4 diol is dispersed in said anti-icing composition in the amount of 0.10% by weight.

8. An anti-icing composition in accordance with claim 1, wherein said diluent chemical is water.

9. An anti-icing composition in accordance with claim 1, wherein said diluent chemical is water or an alcohol or glycol polyol dispersed in said anti-icing composition in the range of 10% to 80% by weight.

10. An anti-icing composition in accordance with claim 1, wherein aid composition includes calcium magnesium acetate dispersed in said anti-icing composition in the range of at least 5% by weight.

11. An anti-icing composition in accordance with claim 1, wherein said anti-spalling compound is a silane compound and is dispersed in said anti-icing composition in the amount of 0.10% by weight.

12. An anti-icing composition in accordance with claim 1, further including an abrasive component dispersed in said anti-icing composition in the range of 10% to 96% by weight.

13. An anti-icing composition in accordance with claim 12, wherein said abrasive component is sand, grit, ash, chipped glass aggregate, pumice, or combinations thereof.

14. An anti-icing composition in accordance with claim 1, further including an indicator component being a water soluble dye.

15. An anti-icing composition in accordance with claim 14, wherein said indicator component disperse in said anti-icing composition is in the range of a trace amount up to 0.5% by weight.

16. An anti-icing composition having anti-corrosion and anti-spalling properties, comprising:

a) an anti-icing chemical selected from the group consisting of magnesium chloride, calcium chloride, sodium chloride, potassium chloride, urea, calcium magnesium acetate, calcium acetate, magnesium acetate, sodium acetate, potassium acetate, sodium formate and combinations thereof, said anti-icing chemicals being at least 5% by weight of said anti-icing composition;

b) an anti-corrosion compound dispersed in said anti-icing composition in the range of trace amounts up to 50% by weight of said anti-icing composition selected from the group consisting of an acetylenic alcohol derivative, alkyl amine, oximine, aryl amine, a thiourea derivative, and an alkyl amine derivative;

c) an anti-spalling compound being a silane compound in the range of trace amounts up to 10% by weight of said anti-icing composition; and d) a diluent chemical being water, alcohols, or glycol polyol in the range of 10% to 80% by weight of said anti-icing composition.

17. An anti-icing composition in accordance with claim 16, wherein said anti-icing composition has a pH value of greater than 7 so as to be alkaline.

18. An anti-icing composition in accordance with claim 17, wherein said anti-icing composition has a pH value in the range of 7.5 and 8.5 so as to be alkaline.

19. An anti-icing composition in accordance with claim 16, wherein said anti-icing composition has a pH value of less than 7 so as to be acidic.

20. Anti-icing composition in accordance with claim 19, wherein said anti-icing composition has a pH value in the range of 5.5 to 6.5 so as to be acidic.

21. An anti-icing composition in accordance with claim 16, wherein said acetylenic alcohol derivative is dispersed in said anti-icing composition in the range of 1 ppm up to 1% by weight.

22. An anti-icing composition in accordance with claim 16, wherein said acetylenic alcohol derivative is dispersed in said anti-icing composition in the amount of 0.10% by weight.

23. An anti-icing composition in accordance with claim 16, wherein said alkyl amine is dispersed in said anti-icing composition in the range of 1 ppm up to 1% by weight.

24. An anti-icing composition in accordance with claim 16, wherein said alkyl amine is dispersed in said anti-icing composition in the amount of 0.10% by weight.

25. An anti-icing composition in accordance with claim 16, wherein said oximine is dispersed in said anti-icing composition in the range of 1 ppm up to 1% by weight.

26. An anti-icing composition in accordance with claim 16, wherein said oximine is dispersed in said anti-icing composition in the amount of 0.10% by weight.

27. An anti-icing composition in accordance with claim 16, wherein said aryl amine is dispersed in said anti-icing composition in the range of 1 ppm up to 1% by weight.

28. An anti-icing composition in accordance with claim 16, wherein said aryl amine is dispersed in said anti-icing composition in the amount of 0.10% by weight.

29. An anti-icing composition in accordance with claim 16, wherein said thiourea derivative is dispersed in said anti-icing composition in the range of 1 ppm up to 1% by weight.

30. An anti-icing composition in accordance with claim 16, wherein said thiourea derivative is dispersed in said anti-icing composition in the amount of 0.10% by weight.

31. An anti-icing composition in accordance with claim 16, further including an abrasive component selected from the group consisting of sand, ash, chipped glass aggregate, grit, pumice and combinations thereof dispersed in said composition in the range of 10% to 96% by weight.

32. An anti-icing composing in accordance with claim 16, further including an indicator component being a water soluble dye.

33. An anti-icing composition in accordance with claim 32, wherein said indicator component dispersed in said anti-icing composition is in the range of a trace amount up to 0.5% by weight.

34. An anti-icing composition having anti-corrosion and anti-spalling properties, comprising:

a) an anti-icing chemical selected from the group consisting of calcium chloride, sodium chloride, potassium chloride, magnesium chloride, urea, calcium magnesium acetate, calcium acetate, magnesium acetate, sodium acetate, potassium acetate, sodium formate, and combinations thereof, said anti-icing chemicals being at least 17% by weight of said anti-icing composition;

b) an anti-corrosion compound being a corrosion inhibitor chemical that prevents base metal attack in a steel pickling bath in the range of trace amounts up to 5% by weight of said anti-icing composition;

c) an anti-spalling compound being magnesium chloride in the range of trace amounts up to 10% by weight of said anti-icing composition; and d) a diluent chemical being water in the range of 0% to 80% by weight of said anti-icing composition.

35. An anti-icing composition having anti-corrosion and anti-spalling properties, comprising:

a) an anti-icing chemical selected from the group consisting of calcium chloride, sodium chloride, potassium chloride, magnesium chloride, urea, calcium magnesium acetate, calcium acetate, magnesium acetate, potassium acetate, sodium acetate, sodium formate, polyol, and combinations thereof, said anti-icing chemicals being at least 5% by weight of said anti-icing composition;

b) an anti-corrosion compound being a corrosion inhibitor chemical that prevents base metal attack in a steel pickling bath in the range of trace amounts up to 5% by weight of said anti-icing composition;

c) a water-soluble anti-spalling compound in the range of trace amounts up to 10% by weight of said anti-icing composition; and d) a diluent chemical in the range of 10% to 80% by weight of said anti-icing composition.

36. An anti-icing composition in accordance with claim 35, wherein said anti-corrosion compound is 2 butyne 1,4 diol.

37. An anti-icing composition in accordance with claim 35, wherein said anti-corrosion compound is selected from the group consisting of an acetylenic alcohol derivative, alkyl amines, oximines, aryl amines, thiourea derivatives, aromatic and alkyl amine derivatives, quaternaries, fatty acid ethoxylates, complex sulfur compounds and heteroaromatics.

* * * * *